United States Patent
Heyl et al.

(10) Patent No.: US 12,202,514 B2
(45) Date of Patent: Jan. 21, 2025

(54) METHOD FOR EVALUATING ROUTE SECTIONS

(71) Applicant: MERCEDES-BENZ GROUP AG, Stuttgart (DE)

(72) Inventors: Andreas Heyl, Renningen (DE); Maximilian Muffert, Belmont, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 221 days.

(21) Appl. No.: 17/914,511

(22) PCT Filed: Feb. 19, 2021

(86) PCT No.: PCT/EP2021/054201
§ 371 (c)(1),
(2) Date: Sep. 26, 2022

(87) PCT Pub. No.: WO2021/190840
PCT Pub. Date: Sep. 30, 2021

(65) Prior Publication Data
US 2023/0135159 A1    May 4, 2023

(30) Foreign Application Priority Data
Mar. 27, 2020    (DE) ..................... 10 2020 108 508.7

(51) Int. Cl.
*B60W 60/00* (2020.01)
*B60W 40/02* (2006.01)
*G01C 21/36* (2006.01)

(52) U.S. Cl.
CPC ........ *B60W 60/0011* (2020.02); *B60W 40/02* (2013.01); *G01C 21/3644* (2013.01);
(Continued)

(58) Field of Classification Search
CPC ............. B60W 60/0011; B60W 40/02; B60W 2552/53; B60W 2555/20; B60W 2556/20;
(Continued)

(56) References Cited

U.S. PATENT DOCUMENTS

| 10,152,056 B2 | 12/2018 | Rohde et al. |
| 2002/0161518 A1 | 10/2002 | Petzold et al. |

(Continued)

FOREIGN PATENT DOCUMENTS

| CN | 101317175 A | 12/2008 |
| CN | 104933856 A | 9/2015 |

(Continued)

OTHER PUBLICATIONS

Machine Translation of DE102014013672A1 (Year: 2015).*

(Continued)

*Primary Examiner* — Sahar Motazedi
(74) *Attorney, Agent, or Firm* — PATENT PORTFOLIO BUILDERS PLLC

(57) ABSTRACT

A method for evaluating suitability route sections of a digital map storing landmarks for automated driving operation of a vehicle is provided. For each route section of the digital map a spatial density of landmarks is determined, an expected recognizability of the landmarks is determined by a vehicle sensor system under predetermined ambient conditions, a classification is performed based on the determined density and recognizability of the landmarks as to whether a vehicle can be located on the route section with a minimum accuracy required for a predetermined operating mode and/or for a predetermined driving maneuver, and a classification result is stored as a data record in a route attribute associated with the route section, the route attribute indicating for which of the predetermined operating modes and/or driving maneuvers requirements for the minimum accuracy of the land- (Continued)

Figure 1:
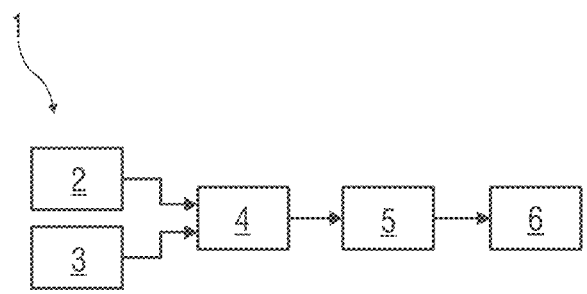

mark-based vehicle localization are met under which of the predetermined environmental conditions.

11 Claims, 1 Drawing Sheet

(52) U.S. Cl.
CPC ..... *G01C 21/3658* (2013.01); *B60W 2552/53* (2020.02); *B60W 2555/20* (2020.02); *B60W 2556/20* (2020.02); *B60W 2556/40* (2020.02); *B60W 2556/50* (2020.02)

(58) Field of Classification Search
CPC .......... B60W 2556/40; B60W 2556/50; G01C 21/3644; G01C 21/3658; G01C 21/30; G01C 21/3679; G01C 21/3691; G01C 21/3822; G01C 21/3811; G05D 1/0055; G05D 1/0088; G05D 1/0274
See application file for complete search history.

(56) References Cited

U.S. PATENT DOCUMENTS

| | | | |
|---|---|---|---|
| 2017/0305420 A1 | 10/2017 | Desens et al. | |
| 2018/0066960 A1* | 3/2018 | Tateishi | G05D 1/0274 |
| 2020/0293043 A1* | 9/2020 | Torschmied | G05D 1/0088 |
| 2021/0003404 A1* | 1/2021 | Zeng | G01C 21/3605 |
| 2021/0009107 A1 | 1/2021 | Ries et al. | |
| 2021/0179138 A1 | 6/2021 | Terazawa et al. | |
| 2021/0180979 A1 | 6/2021 | Kitahara | |
| 2021/0341310 A1 | 11/2021 | Wilbers et al. | |

FOREIGN PATENT DOCUMENTS

| | | | | |
|---|---|---|---|---|
| CN | 106715224 A | | 5/2017 | |
| CN | 109643367 A | | 4/2019 | |
| DE | 102014013672 A1 | * | 4/2015 | ............ B60W 40/06 |
| DE | 102014014120 A1 | | 4/2015 | |
| DE | 102015220360 A1 | | 4/2017 | |
| DE | 102016224042 A1 | * | 6/2018 | |
| DE | 102017004118 A1 | | 10/2018 | |
| DE | 102017211556 A1 | * | 1/2019 | ......... G01C 21/3446 |
| DE | 102018118220 A1 | | 1/2020 | |
| DE | 102019007861 A1 | | 5/2021 | |
| JP | 2020038200 A | | 3/2020 | |
| JP | 2020038359 A | | 3/2020 | |
| WO | 2018197255 A1 | | 11/2018 | |

OTHER PUBLICATIONS

Machine Translation of DE102016224042A1 (Year: 2018).*
Machine Translation of DE102017211556A1 (Year: 2019).*
Japanese Notice of Reasons for Refusal mailed Nov. 21, 2023, for corresponding/related Japanese Application No. 2022-558477, including English translation (8 pages).
International Search Report mailed May 6, 2021 in related/corresponding International Application No. PCT/EP2021/054201.
Office Action created Nov. 27, 2020 in related/corresponding DE Application No. 10 2020 108 508.7.
Written Opinion mailed May 6, 2021 in related/corresponding International Application No. PCT/EP2021/054201.
Office Action dated Oct. 25, 2024 in related/corresponding CN Application No. 202180024805.

* cited by examiner

METHOD FOR EVALUATING ROUTE SECTIONS

BACKGROUND AND SUMMARY OF THE INVENTION

Exemplary embodiments of the invention relate to a method for evaluating route sections, as well as to a method for operating a vehicle.

WO 2018/197255 A1 discloses a method for fully automated driving operation of a vehicle, in which the vehicle is localized using landmarks stored in a digital map. Here, fully automated driving operation is only permitted on sections of road that have been approved for such driving operation. The prerequisite for this approval is that a localization accuracy with which the vehicle can be localized on a preceding route section fulfils predefined requirements that depend on the respective route. Here, the localization accuracy for the route section ahead is predicted based on a spatial density of the landmarks stored in the digital map.

Furthermore, a method for autonomous operation of a vehicle on a route section ahead is known from DE 10 2014 014 120 A1. The autonomous operation of the vehicle is only approved if, for a predetermined distance of the route ahead, it is fulfilled that a position of the vehicle is determined in the vehicle with a positional accuracy that is better than a predetermined limit value, and digital map data on the course of the road is available with a positional accuracy that is better than a predetermined limit value.

DE 10 2019 007 861.6, which has not yet been published, describes a method for approving a route for automated driving operation of a vehicle, wherein a route ahead of the vehicle is approved for automated driving operation of the vehicle if it is determined by means of a digital map, which is used during automated driving operation for landmark-based localization of the vehicle, that landmarks are present along the route which, with regard to their suitability for longitudinal and transverse localization of the vehicle, fulfil requirements that are predefined as a function of a course of the route. Furthermore, a maximum driving speed of the vehicle for automated driving operation is specified based on a localization accuracy of the vehicle and as a function of the route section.

Exemplary embodiments of the invention are directed to a method for evaluating route sections of a digital map with respect to their suitability for automated driving operation of a vehicle, which is improved compared to the state of the art, as well as a method for operating a vehicle.

In a method for evaluating route sections of a digital map with regard to their suitability for automated driving operation of a vehicle, wherein landmarks for landmark-based vehicle localization are stored in the digital map, according to the invention a spatial density of landmarks is determined for each route section of the digital map. Furthermore, an expected detectability of the landmarks by a vehicle sensor system under predefined ambient conditions is determined for each section of the route, based on the determined density and detectability of the landmarks, a classification is carried out as to whether a vehicle can be located on the section of the route with a minimum accuracy required for a predefined operating mode and/or for a predefined driving maneuver. Furthermore, for each route segment of the digital map, a classification result is stored as a dataset in a route attribute allocated to the route segment, wherein the route attribute states for which of the predefined operating modes and/or driving maneuvers, under which of the predefined environmental conditions, requirements for the minimum accuracy of the landmark-based vehicle localization are met.

A degree of accuracy of a map-based localization of a vehicle, for example an automated, in particular highly automated or autonomously driving vehicle, is at least partially dependent on a number of available landmarks and features for a data allocation in a local, detectable environment. However, if only a small number of landmarks is available, an accuracy of a primary localization function based on these landmarks decreases to a point where a determined vehicle pose is no longer accurate enough and fallback methods, such as odometry data-based dead reckoning, have to be used to temporarily determine the vehicle pose. However, these fallback methods are typically less accurate than map feature-based localization and quickly lead to high uncertainties in the pose of a vehicle, such as an automated driving vehicle, in particular at medium to high speeds.

Furthermore, in certain situations, after the occurrence of faults or limitations that significantly affect a vehicle's performance, an automatically driving vehicle must automatically cover a longer distance of, for example, up to two minutes to reach a safe location, for example a hard shoulder, which may be several hundred meters away.

Furthermore, it is possible that a sudden scarcity of landmarks may lead to a rapid degradation or even loss of localization and/or a map-based determined vehicle pose, such that there is a risk that a more distant safe location cannot be reached or that opportunities to follow a safe trajectory to a safe state, for example by executing emergency braking, are limited.

Even if a localization of a vehicle based on landmarks is in principle still possible with sufficient accuracy, an integrity, for example according to ISO 26262, of the result may be low. This means that if only one type of feature, for example only so-called poles, or only one type of sensor modality, for example only a lidar, which typically satisfies a so-called Automotive Safety Integrity Level B, ASIL B for short, but not ASIL D, an automated driving vehicle must also react to such a reduction in integrity and reduce its performance.

By means of the method, however, route sections with a low density of landmarks, which could lead to a high uncertainty and/or a low integrity of the pose of an automatically driving vehicle, can be predicted for future driving routes of the vehicle based on an evaluation of map data, for example a-priori maps and/or dynamic map data, and an environment perception. If such route sections with a low density of landmarks are located on a route of a vehicle, a behavior and/or a trajectory of the automatically driving vehicle can be adapted in such a way that a sufficiently accurate, safe, and redundant pose of the vehicle for safe automated operation based on a low number of landmarks can still be provided by means of a localization function. Alternatively, or additionally, it is possible by means of the method to operate the vehicle in an adapted, e.g., downgraded, mode in which safety requirements for providing a sufficiently accurate, safe, and redundant pose of the vehicle are lower and which can be performed with fewer landmarks.

This means that, by predicting a suitability of the route segments of a digital map for an automated driving operation of the vehicle, the automated vehicle can react proactively and in advance to a decrease in a density and/or detectability of the landmarks and avoid a critical gradual or sudden loss of localization that may lead to dangerous events and/or difficult situations.

In a possible design of the method, the expected detectability is determined for each lane present on the route section and/or for different lateral deviations of the vehicle within a lane. This enables an exact prediction of the detectability of the landmarks for each lane and/or lateral deviation and thus, when used in an operation of an automatically driving vehicle, a determination of an optimized driving route with regard to safety.

In a further possible design of the method, the classification result and the associated route attribute are used to indicate on which lane and/or at which transverse position of the vehicle the minimum accuracy of the vehicle localization required for the respective operating mode and/or for the respective driving maneuver can be maintained. When used in the operation of an automatically driving vehicle, this also enables a route to be determined that is optimized in terms of safety.

In a further possible design of the method, the classification result and the associated route attribute are used to indicate which lane and/or which lateral deviation of the vehicle are or is most suitable for the respective operating mode and/or the respective driving maneuver. This makes it possible to select an operating mode in advance in which the probability of the vehicle safely reaching the target is greatest.

In a further possible design of the method, the classification is carried out on a central computing unit external to the vehicle, for example a so-called backend server. On the one hand, this means that no additional computing power is required in the vehicle itself to carry out the classification. Furthermore, the classification can be carried out centrally for a large number of vehicles and thus effectively and economically.

In a further possible design of the method, information about the recognizability of the landmarks and/or current environmental conditions is recorded by vehicles while passing the landmarks. The information collected in this way can be processed decentrally in the vehicles themselves to classify the route sections or transmitted to a suitable central computing unit external to the vehicle, which carries out the classification. Due to a large number of vehicles, a very reliable collection of information about the recognizability of the landmarks is possible, which can significantly increase the reliability of the classification.

In a further possible design of the method, the following are taken into consideration as ambient conditions:
lighting conditions, such as daylight, night or glare from the sun,
times of day,
precipitation, for example rain, snowfall, and fog, and/or
properties of surrounding objects, for example their reflectivity. This consideration of environmental conditions enables a proactive avoidance, which can be implemented in advance, of a critical gradual or sudden loss of localization of the vehicle due to a decrease in a density and/or detectability of the landmarks, which may also occur suddenly, for example, due to changing weather conditions with adverse effects on detection. Thus, a classification of the track sections adapted to these environmental conditions can be performed. As a result, different classifications can be carried out for different environmental conditions, which can be used in a situation-related manner, i.e., depending on the environmental conditions present during a subsequent journey of a vehicle, when planning its route.

In a further possible design of the method, a fully automated driving mode of a vehicle, a highly automated driving mode of a vehicle and/or an operation of a vehicle in a specific speed range are specified as operating modes and/or lane keeping maneuvers, lane change maneuvers, overtaking maneuvers and/or turning maneuvers are specified as driving maneuvers. This specification of the operating modes and/or driving maneuvers allows an individually adapted determination of a safe driving route for a vehicle, taking the route attributes into consideration.

In a method for operating a vehicle, according to the invention, certain operating modes and/or driving maneuvers are approved or blocked and/or a route, lane, lateral deviation and/or driving speed to be adhered to during automated driving operation is or are determined as a function of route attributes determined in a previously described method.

By means of the method, a degree of safety and reliability of the operation of the vehicle can be increased, since route sections with a low density of landmarks, which could lead to a high degree of uncertainty and/or a low degree of integrity of the pose of an automatically driving vehicle, can be predicted for future driving routes of the vehicle based on an evaluation of map data, for example a-priori maps and/or dynamic map data, and an environment perception. When carrying out the method, a behavior and/or a trajectory of the automatically driving vehicle can be adapted in a simple manner to the known route attributes, such that, for example by means of a localization function, a sufficiently accurate, safe, and redundant pose of the vehicle can still be provided for safe automated operation based on a small number of landmarks. Alternatively, or additionally, it is possible by means of the method to operate the vehicle in an adapted, e.g., downgraded, mode in which safety requirements for providing a sufficiently accurate, safe and redundant pose of the vehicle are lower and which can be performed with fewer landmarks.

In a possible design of the method, the route attributes are retrieved by the vehicle from a central computing unit, for example a so-called backend server. On the one hand, this means that no additional computing power is required in the vehicle itself to carry out the classification. Furthermore, the classification can be carried out centrally for a large number of vehicles and thus effectively and economically. When the information required for classification is collected by means of a large number of vehicles, particularly precise and reliable route attributes can be generated and made available for each vehicle by means of the central computing unit.

Exemplary embodiments of the invention are described in more detail below by means of drawings.

BRIEF DESCRIPTION OF THE DRAWING FIGURES

Figure 2:
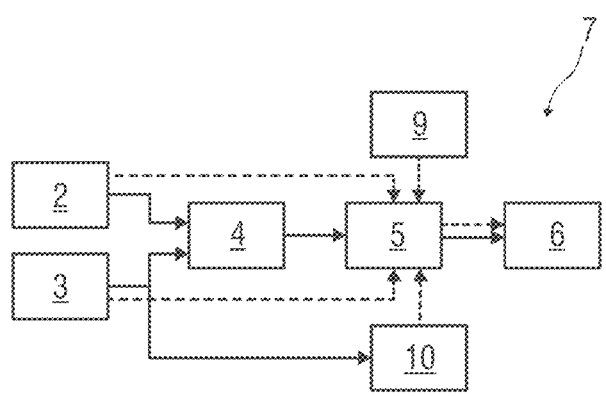
Figure 3:
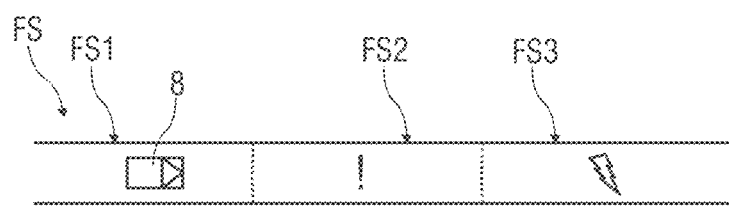

Here are Shown in:

FIG. 1, schematically, a block wiring diagram of a device for operating a vehicle according to the prior art, FIG. 2, schematically, a block wiring diagram of a device for operating a vehicle, and FIG. 3, schematically, a top view of a driving route of a vehicle having several route sections.

DETAILED DESCRIPTION

Parts corresponding to one another are provided with the same reference numeral in all figures.

A block wiring diagram of a device 1 for operating an automated, in particular highly automated or autonomously driving vehicle according to the state of the art is depicted in FIG. 1.

The device 1 comprises a digital map 2, a vehicle sensor system 3, a localization unit 4, a modelling unit 5 for generating a model of a vehicle environment, and a behavior planning unit 6.

By means of the localization unit 4, the vehicle is localized in its vehicle environment based on environment data detected by means of the vehicle sensor system 3, for example detected landmarks, and/or map data of the digital map 2, for example landmarks stored in the map.

As a result of this localization, a vehicle pose is transmitted to the modelling unit 5, which generates a model of the vehicle environment. Based on this model, the behavior planning unit 6 plans a future behavior of the vehicle during automated driving.

FIG. 2 shows a block wiring diagram of a possible exemplary embodiment of a device 7 for operating an automated, in particular highly automated or autonomously driving vehicle 8 depicted in FIG. 3. A basic function of the device 7 corresponds to a function of the device 1 depicted in FIG. 1.

A degree of accuracy of a map-based localization of a vehicle 8 is at least partially dependent on a number of available landmarks and features for a data mapping in a local, detectable vehicle environment. However, if only a small number of landmarks is present, a degree of accuracy of a primary localization function based on these landmarks and executed by means of the localization unit 4 decreases to a point where the ascertained vehicle pose is no longer accurate enough and fallback methods, such as dead reckoning based on odometry data, have to be used to temporarily determine the vehicle pose. However, these fallback methods are usually less accurate than map feature-based localization and quickly lead to high uncertainties in determining the vehicle pose, especially at medium to high speeds.

A scarcity of landmarks can, for example, have static causes and result, for example, from characteristics of the environment, such as, for example, a country road without buildings, without poles, and/or without lane markings, which can be used (a priori) as perceptible landmarks. However, the scarcity of landmarks can also have dynamic causes and results here, for example, from conditions that limit the performance of the vehicle sensors 3 that detect the landmarks. These can be, for example, unfavorable environmental conditions, such as sun glare or snow, or traffic scenarios, such as vehicles, trucks or buses that obscure a field of view of the vehicle sensor system 3.

In order to solve this problem, it is provided that route sections FS1 to FS3 shown in more detail in FIG. 3 are evaluated in the digital map 2, in which landmarks are stored for landmark-based vehicle localization, with regard to their suitability for automated driving operation of the vehicle 8.

For this purpose, a spatial density of landmarks and an expected recognizability of the landmarks are determined by the vehicle sensor system 3 under predefined ambient conditions, in particular predefined light conditions, times of day, precipitation and/or properties of surrounding objects. The expected recognizability is determined, in particular, for each lane present on the route section FS1 to FS3 and/or for different transverse positions of the vehicle 8 within a lane.

The determination of the spatial density of the landmarks is carried out, for example, by an offline analysis of the digital map. Alternatively, or additionally, the determination of the spatial density of the landmarks is carried out based on sensor data of the vehicle 8, of survey vehicles, of other automated driving vehicles 8, by so-called crowd sourcing or so-called swarm sources, in which case, for example, an evaluation of the sensor data is evaluated with regard to a performance and redundancy of a recognition of landmarks along a specific route or lane. In this case, a performance can depend on a direction of travel and/or a lane travelled. For example, information about the recognizability of the landmarks and/or current ambient conditions during the passage of the landmarks is recorded by a plurality of vehicles 8, for example vehicles 8 of a vehicle fleet, and transmitted to an off-vehicle central computer unit 9 shown in more detail in FIG. 3.

By means of the central computing unit 9, a classification is carried out based on the determined density and recognizability of the landmarks as to whether a vehicle 8 can be localized on a route section FS1 to FS3 with a minimum accuracy required for a predefined operating mode and/or for a predefined driving maneuver. For example, a fully automated driving mode of a vehicle 8, a highly automated driving mode of a vehicle 8, and/or an operation of a vehicle 8 in a certain speed range are specified as operating modes. For example, lane keeping maneuvers, lane change maneuvers, overtaking maneuvers and/or turning maneuvers are specified as driving maneuvers.

As a result of the classification, a classification result is stored as a dataset in a route attribute associated with the route section FS1 to FS3, wherein the route attribute indicates for which of the specified operating modes and/or driving maneuvers, under which of the specified environmental conditions, requirements for the minimum accuracy of the landmark-based vehicle localization are met. In addition, by means of the classification result and the associated route attribute, it is indicated, for example, on which lane and/or at which transverse position of the vehicle 8 the minimum accuracy of the vehicle localization required for the respective operating mode and/or for the respective driving maneuver can be met. Furthermore, the classification result and the associated route attribute can be used to indicate which lane and/or which transverse position of the vehicle 8 are or is most suitable for the respective operating mode and/or the respective driving maneuver.

The classification can distinguish, for example, between the following route attributes:
Number of landmarks present is sufficient;
Number of landmarks present is not sufficient;
Density of landmarks for certain driving maneuvers is sufficient;
Density of landmarks for certain driving maneuvers is not sufficient;
Quality of a landmark of a certain type is sufficient;
Quality of a landmark of a certain type is not sufficient;
Landmarks of only one specific type available;
Landmarks of only one specific sensor modality available.

Furthermore, the route attributes can be extended to include and classify a probability of low density of landmarks due to limitations of the vehicle sensor system 3 depending on certain environmental conditions, such as for instance
Lighting conditions, such as daylight, night, twilight;
Time of day, such as driving towards a sunset, which may cause glare;
Precipitation, such as rain, snowfall, and fog; and/or
Properties of surrounding objects, such as their reflectivity.

These features or environmental conditions can then be evaluated in the vehicle 8 taking into consideration the current environmental conditions provided either by the vehicle sensor system 3 or a fusion of several sensor systems and/or by the central processing unit 9, and/or can be detected by checking a time of day in relation to a sunrise and sunset to determine a possibility of an insufficient number of landmarks on the lane sections FS1 to FS3.

In a possible design, the route attributes are extended to also classify a probability of insufficient landmarks due to limitations of the vehicle sensor system 3 depending on traffic situations, for example due to occlusions due to high vehicles, and/or special events, for example smoke due to forest fires. These route attributes are evaluated in the vehicle, for example, taking into consideration a current traffic situation and the events provided by the central computing unit 9 or detected in advance by the vehicle sensor system 3.

The modelling unit 5 can thus generate an adapted model of the vehicle environment based on the knowledge of the route attributes and, if applicable, further information from the digital map 2, the vehicle sensor system 3, the central computing unit 9, and/or by means of machine learning 10 and, if applicable, sends corresponding information for adapting and restricting the operation of the vehicle 8 to the behavior planning unit 6. The interrupted connections represent interfaces that are used by the modelling unit 5 to predict the model.

A top view of a driving route FS of a vehicle 8 having several route sections F1 to FS3 is depicted in FIG. 3.

Here, the vehicle 8 moves in a route section FS1 in a normal autonomous driving operation in the direction of the route sections FS2, FS3. Based on the knowledge of the route attributes determined according to the description, it is already known before reaching the route sections FS2, FS3 that there are restrictions for the automated driving operation of the vehicle 8 in route section FS3. For this purpose, the route attributes are retrieved by the vehicle 8, for example, from the central processing unit 9.

Based on this knowledge, the vehicle 8 can already restrict certain operating modes and/or driving maneuvers upon reaching the second route section FS2 and/or determine a route, lane, lateral deviation, and/or driving speed to be maintained during automated driving operation in such a way that safe operation of the vehicle 8 is possible upon entering the third route section FS3 despite a low density of landmarks. This can be performed online or offline and checks the route attributes of the preceding route sections FS1 to FS3 and determines areas with a high probability of low density of landmarks. If such an area, such as route section FS3, is determined, the adaptation measures are triggered before this route section FS3 is reached.

The adjustment measures comprise, for example:
an adjustment or reduction of a driving speed;
a preference of a position within a lane (left, center, right);
a preference of a certain lane in a multilane road;
a limitation of a driving behavior, for example inhibiting more complex maneuvers, such as a lane change, for example;
a choice of a different driving route; and/or
requesting additional information from the central computing unit.

Triggering these adaptation actions can be done either directly by sending dedicated commands to the behavior planning unit 6 and/or indirectly by artificially altering quality or integrity information data, for example in an interface to the behavior planning unit 6, to trigger a tactical safety response.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:
    determining, by a central computing unit using a digital map and for each route section of the digital map, a spatial density of landmarks;
    determining, by the central computing unit for the each route section of the digital map, an expected recognizability of the landmarks in predetermined environment conditions by a vehicle sensor system;
    performing, by the central computing unit for the each route section and based on the determined spatial density and the determined expected recognizability of the landmarks in the predetermined environment conditions, a classification as to whether a vehicle having the vehicle sensor system can be localized on the route section with a minimum degree of accuracy required for a predetermined operating mode or for a predetermined driving maneuver;
    saving, by the central computing unit for the each route section based on the classification, a result of the classification as a dataset in a route attribute allocated to the route section, wherein the route attribute states for which (i) of predetermined operating modes, which includes the predetermined operating mode, or (ii) predetermined driving maneuvers, which includes the predetermined driving maneuver, and in which of the predetermined environment conditions, requirements for the minimum degree of accuracy of landmark-based vehicle localization are fulfilled;
    generating, by a first vehicle operating in an autonomous driving mode, a future driving behavior of the first vehicle over a route containing a plurality of route sections, wherein the plurality of route sections are part of the each route section of the digital map;
    transmitting, from the central computing unit to the first vehicle, the route attribute for each of the plurality of route sections;
    determining, by the first vehicle based on the route attribute for each of the plurality of route sections, adjustments to the autonomous driving mode in at least one of the plurality of route sections; and
    adjusting, by the first vehicle based on the determined adjustments, operation of the first vehicle prior to reaching the at least one of the plurality of route sections.

2. The method of claim 1, further comprising:
    determining the expected recognizability for each lane present on the route section or for different lateral deviations of the vehicle within a lane.

3. The method of claim 2, wherein the result of the classification and the corresponding route attribute indicate on which lane or at which lateral deviation of the vehicle the minimum degree of accuracy of the landmark-based vehicle localization required for a respective operating mode of the predetermined operating modes or for a respective driving maneuver of the predetermined operating maneuvers can be maintained.

4. The method of claim 3, wherein the result of the classification and the corresponding route attribute indicate which lane or which lateral deviation of the vehicle is most suitable for the respective operating mode or the respective driving maneuver.

5. The method of claim 1, wherein information about recognizability of the landmarks or current environmental conditions is recorded during a passage of the landmarks by vehicles.

6. The method of claim 5, wherein the current environmental conditions include lighting conditions, times of day, precipitation, or properties of surrounding objects.

7. The method of claim 1, wherein
the predetermined operating modes include a fully automated driving mode of the vehicle, a highly automated driving mode of the vehicle, or an operation of the vehicle in a specific speed range, or
the predetermined driving maneuvers include lane-keeping maneuvers, lane- change maneuvers, overtaking maneuvers, or turning maneuvers.

8. A method for operating a vehicle in an autonomous driving mode, the method comprising:
generating, by the vehicle while operating in the autonomous driving mode, a future driving behavior of the vehicle over a route containing a plurality of route sections of a digital map storing landmarks for each of the plurality of route sections;
receiving, by the vehicle from a central server, a route attribute respectively allocated to each of the plurality of route sections, wherein the route attribute is determined by performing, based on a spatial density of the landmarks and an expected recognizability of the landmarks in predetermined environment conditions, a classification as to whether the vehicle can be localized on the route section with a minimum degree of accuracy required for a predetermined operating mode or for a predetermined driving maneuver and wherein the route attribute states for which (i) of predetermined operating modes, which includes the predetermined operating mode, or (ii) predetermined driving maneuvers, which includes the predetermined driving maneuver, and in which of the predetermined environment conditions, requirements for the minimum degree of accuracy of landmark-based localization of the vehicle are fulfilled;
determining, by the vehicle based on the route attribute for each of the plurality of route sections, adjustments to the autonomous driving mode in at least one of the plurality of route sections; and
adjusting, by the vehicle based on the determined adjustments, operation of the vehicle prior to reaching the at least one of the plurality of route sections.

9. The method of claim 8, wherein the adjusting the operation of the vehicle comprises changing an operating mode of the vehicle from the autonomous driving mode.

10. The method of claim 8, wherein the adjusting the operation of the vehicle includes blocking the autonomous driving mode.

11. The method of claim 8, further comprising: determining, by the vehicle based on the route attribute for each of the plurality of route sections, a route, driving lane, lateral deviation, or driving speed to be adhered to during the autonomous driving mode.

* * * * *